R. RÜDENBERG.
ELECTRICAL CONDUCTOR AND MOUNTING SAME IN ELECTRICAL APPARATUS.
APPLICATION FILED SEPT. 18, 1913.
1,285,398.
Patented Nov. 19, 1918.
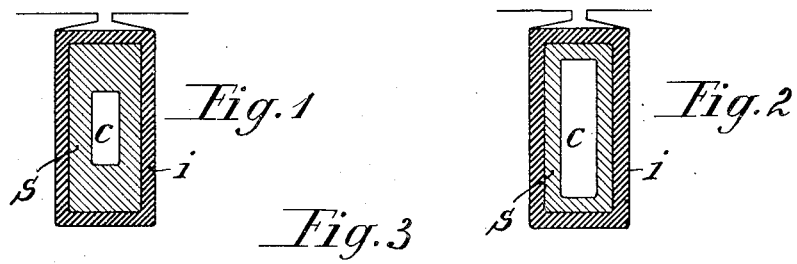
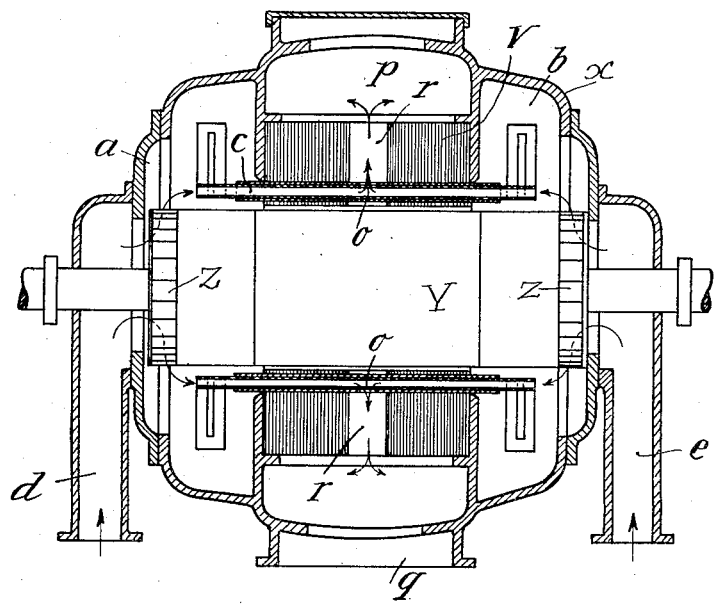

UNITED STATES PATENT OFFICE.

REINHOLD RÜDENBERG, OF BERLIN-WESTEND, GERMANY, ASSIGNOR TO SIEMENS-SCHUCKERTWERKE, G. M. B. H., OF BERLIN, GERMANY, A CORPORATION OF GERMANY.

ELECTRICAL CONDUCTOR AND MOUNTING SAME IN ELECTRICAL APPARATUS.

1,285,398.  Specification of Letters Patent.  Patented Nov. 19, 1918.

Application filed September 18, 1913. Serial No. 790,533.

*To all whom it may concern:*

Be it known that I, REINHOLD RÜDENBERG, a German citizen, and resident of Berlin-Westend, Germany, have invented certain new and useful Improvements in Electrical Conductors and Mounting Same in Electrical Apparatus, of which the following is a full, clear, and concise specification.

My invention relates to means for cooling electrical machinery and more especially to high voltage dynamos. The object of my invention is to provide improved means for cooling the stator of a machine of this character.

As is well known to those skilled in the art, the heat generated in the stator conductors of a high voltage dynamo cannot escape at the circumference of the conductors, for the reason that they are embedded in a thick-walled tube of insulating material, contained in the slots of said stator. In the past, it has been customary to prevent the temperature in the interior of the active stator iron from becoming excessive and thus spoiling the electrical efficiency of the machine, by cooling the end connections of the conductors and providing cooling channels in the active iron of the stator. In the modern highly utilized dynamos this method of cooling has been found to be inadequate, the electrical effect of machinery of this class having been, in fact, greatly impaired by reason of the impossibility of quickly eliminating the heat which accumulates in the stator.

My invention contemplates suitable and efficient means for disposing of the heat generated in the conductors of the stator of a high voltage dynamo by employing hollow conductors instead of solid ones, the radiation surface of such hollow conductors being far greater than the surface of solid conductors. Moreover by passing an air current through these hollow conductors a very efficient abduction of heat from the interior of the conductors can be easily obtained and this abduction of heat may be rendered still more efficient in machines of greater axial length by providing openings in the middle part of the conductors and of the insulating tubes surrounding them, corresponding openings being provided in the stator body so that a constant current of air can be made to enter the open ends of the hollow conductors and after passing through them to escape by way of the openings in the middle part of the conductors and insulating tubes and through the radial openings provided in the stator. The heat-laden air finally escapes through openings in the casing of the stator.

My invention will be more fully understood by reference to the accompanying drawing of which Figures 1 and 2 are cross-sections of forms of conductors according to my present invention, Fig. 3 is a vertical longitudinal section of a high voltage dynamo whose stator is provided with such conductors and with means for creating a current of air from both sides of the machine through the conductors and through the central part of the stator. In my copending application Serial No. 126,320, filed October 18th, 1916, which application is a division of the present case, I have described and claimed certain modifications of the apparatus hereinafter described and claimed.

I am aware that it is old to employ hollow conductors or conductors provided with longitudinal channels extending all through their length in connection with the rotating parts of electric machinery, the hollow conductors being used in these cases also for cooling the conductors and the rotating parts carrying them. The problem of cooling rotating parts such as for instance, the rotor of a dynamo by providing longitudinal channels in the conductors, arranged on the periphery of such a rotor, was easy to solve on account of the centrifugal action exerted upon the air contained in these channels during rotation of the tubes around the dynamo shaft at high speed.

In contradistinction to this, there are a number of reasons which seem to make it undesirable to make the conductors of the stators of a high voltage dynamo hollow. As is well known, the size of modern high voltage dynamos is limited by the permissible circumferential velocity of the rotor. On the other hand, the size of the slots is limited in accordance with the size of the stator for the reason that the high voltage employed requires insulating tubes of a certain minimum thickness to be used in order to insulate the conductors against the stator iron. Now the effect of a high voltage machine, having a rotor of certain dimensions, depends mainly upon the sectional area of the conductors and the efficiency depends upon the resistance offered by these conductors. Therefore the idea of abducting the heat generated within the conductors by making them hollow and passing a current of air through them, does not seem to be consistent with the condition that the resistance of the conductors should be kept as low as possible; for by making them hollow, the resistance of the conductors is greatly increased. On the other hand, it seems impossible to employ hollow conductors having a greater cross-section for the reason that then the cross-section of the slots would have to be increased also. This, however, is impossible, owing to lack of space and to the greater saturation obtained by reducing the thickness of the slot walls, such increase of saturation resulting in increased losses of electrical energy. On the other hand, the skin effect brings it about that substantially no current flows through the central part of the conductors, most of the current being caused to flow near the inner periphery of the stator. This skin effect would exist in alternating current dynamos as well as in direct current dynamos, whose armature coils carry current of fluctuating or alternating electro-motive force, which current may be of considerable frequency at the high speed at which these machines must necessarily be operated.

Now, practical tests have shown that contrary to what would have been expected for the reasons explained, the advantages gained by using hollow conductors in the stator of a high voltage dynamo, by far exceed the disadvantages connected with this arrangement, so that the effect of a high voltage dynamo provided with a cooling arrangement of the kind described above, is improved by about 30 per cent.

Referring first in a more general way to the drawing, similar denominations indicate similar parts throughout the figures. The insulating material is designated by the letter $i$, the channel which according to my invention is provided longitudinally in the conductor is designated by $c$, and the solid conductive material of the conductor is designated by $s$.

Referring now more particularly to the drawing in Fig. 1 I have shown a solid conductor having a channel which for instance may be made of rectangular cross-section. This conductor may be made by drawing over a mandrel, or by rolling a rectangular tube such as shown in Fig. 2. The conductor shown in Fig. 2 differs from the one described above only in the cross-sectional area of the channel which is much greater in this case than in the former.

In Fig. 3, $v$ is the stator of a high voltage dynamo, and $c, c$ are conductors such as shown in Figs. 1 and 2, inserted in slots $w, w$, extending across the inner periphery of said stator. $x$ is the stator casing and $a$ and $b$ are pressure chambers arranged on both sides of said casing. $d$ and $e$ are intakes leading from below into said pressure chambers and $o, o$ are openings arranged in the middle part of the conductors $c$ and insulating tubes $i, i$ surrounding them, while $r, r$ are radial openings extending through the active iron of the stator and connecting the interior of the conductors with the exhaust chamber $p$ in the central part of the casing. $q$ is an exhaust outlet at the bottom of the casing. $z, z$ are fans or ventilators arranged at both ends of the rotor $y$.

When the machine is running, the ventilators $z$ will draw in air from outside through the intakes $d$ and $e$ and this air is then pressed into the pressure chambers $a$ and $b$ and from there through the end openings of the hollow conductors $c$ toward the center of the machine in order to escape through the central openings $o$ and $r$ into the central chamber $p$ and exhaust $q$. In this manner a very efficient cooling action is obtained, the heat generated within the conductors as well as part of the heat generated in the active iron $v$ of the stator being carried away by the air so that all undue heating of these parts is obviated and the electrical efficiency of the machine is greatly increased.

I wish it to be understood that I do not by any means limit myself to the particular forms of conductors shown in the drawing and described in the specification, nor to the particular arrangement of a machine as shown in the drawings, since my invention permits a great number of variations without departing from its principle or sacrificing any of its advantages.

Although the conductors shown in the drawings are metal bars or metal tubes in one piece, I may as well employ conductors made up of a plurality of parts, such as stranded conductors or cables showing a longitudinal channel. Further, instead of air as a cooling agent, I may as well employ water or any other suitable gaseous or liquid medium, devices for cooling the rotating parts of electric machinery provided with hollow conductors by aid of water, being well known to those skilled in the art, so that it will be easy to apply these devices to the new combination according to the present invention.

I claim:

1. In a high voltage dynamo in combination, a stator, slots extending across the inner periphery of the said stator, insulating tubes within said slots and hollow conductors within said tubes, said conductors adapted to have generated in them alternating currents of a frequency producing appreciable skin effect, the hollow tube portions permitting the ventilation of said conductors and means for directing a cooling medium through said hollow conductor portions.

2. In a high voltage dynamo in combination, a stator, slots extending across the periphery of said stator, insulating tubes within said slots, conductors of comparatively great cross-sectional area within said insulating tubes, said conductors adapted to have generated in them alternating currents of a frequency producing appreciable skin effect, said conductors being provided with longitudinal channels, to permit ventilation of said conductors, and means for directing a cooling medium through said channels.

3. In a high voltage dynamo, in combination, a stator, slots extending across the inner periphery of said stator, insulating tubes within said slots, hollow conductors within said insulating tubes, the walls of said conductors and insulating tubes and the stator having corresponding openings in their middle parts.

4. In a high voltage dynamo, in combination, a stator, slots extending across the inner periphery of said stator, insulating tubes within said slots, hollow conductors within said insulating tubes, the walls of said conductors and insulating tubes and the stator having corresponding openings in their middle parts, and means for causing a cooling medium to pass into the open end of said conductor and through the said openings in the walls of said conductors and insulating tubes and in the stator.

In witness whereof I have hereunto set my signature in the presence of two subscribing witnesses.

REINHOLD RÜDENBERG.

Witnesses:
WOLDEMAR HAUPT,
HENRY HASPER.